Feb. 6, 1962     T. R. BREUNICH     3,019,663
PROTECTOR FOR RELATIVELY MOVABLE PARTS
Filed Nov. 20, 1958
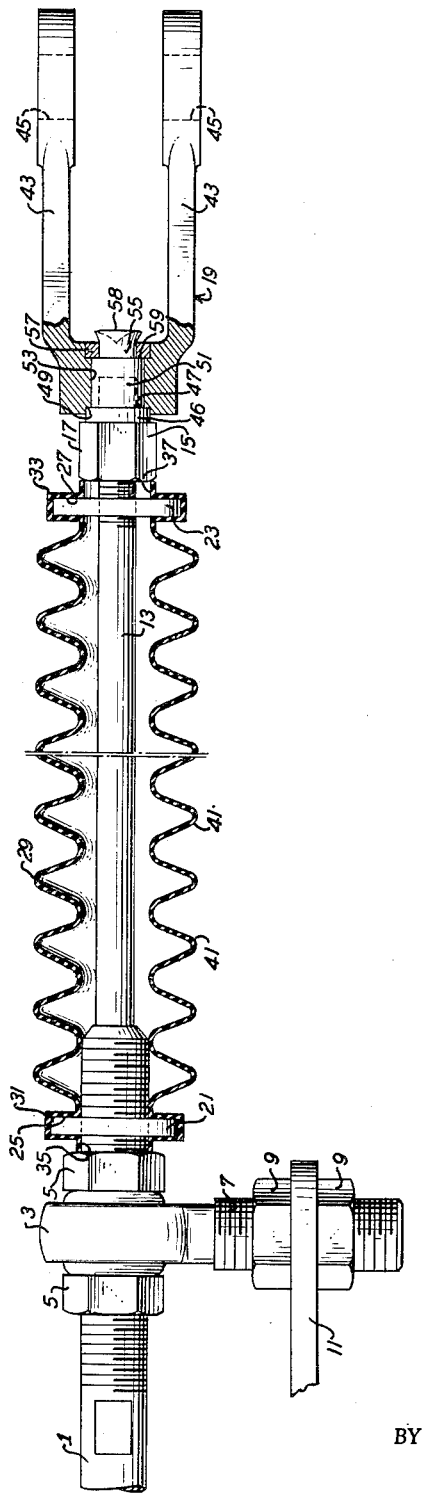
INVENTOR
*THEODORE BREUNICH*
BY *Corey Hart & Stemple*
ATTORNEYS

United States Patent Office 3,019,663
Patented Feb. 6, 1962

3,019,663
PROTECTOR FOR RELATIVELY MOVABLE PARTS
Theodore R. Breunich, Stamford, Conn., assignor to Controlex Corporation of America, White Plains, N.Y., a corporation of New York
Filed Nov. 20, 1958, Ser. No. 775,287
2 Claims. (Cl. 74—18.2)

This invention relates to a protector for a mechanical device having two cooperating members movable away from and toward each other. The invention more especially relates to a protector for a mechanical device having two members movable relative to each other in translation along a line joining these members. The invention particularly relates to a mechanical device of this type in which one of the members of elongated form is slidable into and out of the other member of generally tubular form.

Certain control devices of the push-pull type utilize an elongated tubular member and a member within the tubular member slidable lengthwise of the tube for transmitting to a distant point control movement originated at a given point. The so-called Bowden wire is of this type. In the Patent 2,845,813, issued August 5, 1958, a device of improved form is shown for transmitting push-pull movement between distantly spaced points utilizing a flexible, tubular sheath and strips longitudinally movable therein, this device being capable of being disposed in curvi-linear form to extend as desired around bends in its course between spaced points. In the Patent 2,841,029, issued July 1, 1958, is shown a similar push-pull flexible remote control device having at its ends control or operating rods slidably mounted in the tubular member, the rods being connectible externally to an operating means and to the operated means and the tubular member being supported at its ends against endwise movement thereof.

In devices of this character the inner member or rod which is slidably movable within the tubular member must extend at its ends outwardly beyond the tubular member in order that it may be connected to the operating means and to the mechanism to be controlled or operated. In many cases the extending portions of the inner member or rod may be subjected to deposition and action of water, oil, dirt, grit and dust or other deleterious material. The proper operation of such a flexible transmission device thus may be prevented or signals to be transmitted by the device may become faulty.

It is an object of the invention to provide in such a mechanical device having two members movable away from and toward each other, a protector which is capable of accommodating the relative movement of the two members while enclosing the portions thereof which might collect or be damaged by deleterious material preventing proper operation.

It is another object of the invention to provide a protector which may be mounted on the relatively movable members of the mechanical device and be supported thereby while affording the desired protection.

It is a further object of the invention to provide a protector for this purpose of such character and construction that it may be mounted easily on the mechanical device and provide therewith an enclosure for the relatively movable parts substantially tight against entry of the undesirable foreign materials.

It is a feature of the invention that the protector for the mechanical device of the type to which the invention relates comprises a sleeve which is adapted to be supported at its ends by a pair of rigid discs, these discs being mountable on the respective relatively movable members of the mechanical device so that the sleeve extends about and along the line of the relative movement. It is a particular characteristic of the invention that the sleeve is made of a flexible material of such elasticity that the end portions of the sleeve about the end openings which are formed therein may be elastically stretched to enlarge or deform these openings sufficiently to allow the end portions to be placed over the peripheries of the discs, these end portions of the sleeve being provided with recesses which receive the discs for supporting the sleeve on the mechanical device. The sleeve has such a form that it also may be elastically extended and contracted along the line of movement concomitantly with the movement of the members away from and toward each other.

The invention will be described more particularly in connection with the drawing which shows an embodiment of the invention in a flexible tubular remote control device of the type disclosed in the patents above referred to.

In the drawing a flexible tubular sheath 1 similar to that of the Patent 2,841,029 is supported adjacent an end thereof by a bracket 3 which is secured to the sheath 1 by lock nuts 5 threaded on the sheath and bearing on the respective faces of the bracket 3. The bracket 3 is provided with a stud portion 7 threaded to receive lock nuts 9 which serve to clamp the bracket 3 to a support 11 of any suitable character. The control rod 13 of the flexible remote control device extends outwardly to the right in the drawing beyond the sheath 1 and is threaded at its end to engage the internal threads of a swivel stud 15 which is provided with a hexagon head 17, this stud engaging a clevis 19 which may be connected to an operating handle or other operating means or, on the other hand, at the proper end of the control cable to the mechanism to be controled or operated. The construction of the clevis in cooperation with the swivel stud will be described hereinafter.

Threaded on the sheath 1 in the embodiment disclosed in the drawing is a washer 21. A similar washer 23 is threaded on the end portion of the rod 13 adjacent the hexagon head of the swivel stud 15. Preferably the diameter of these washers is the same and is such that they may be received respectively in recesses 25 and 27 which are formed in the end portions of the protector which is in the form of a sleeve 29. The sleeve thereby is supported on the washers so as to extend between the washers 21 and 23 along and about the line of relative movement of the sheath 1 and the rod 13.

The sleeve 29 in the embodiment disclosed is in the form of a bellows with the corrugations thereof generally coaxial with the line of movement of the rod 13 relative to the sheath 1. In accordance with the invention the protective sleeve 29 is made of a flexible material of sufficient elasticity so that the end portions 31, 33 which are formed to provide the recesses 25, 27 may be stretched to enlarge the openings 35, 37 thereof, so that these end portions may be placed about the peripheries of the respective discs 21, 23 as the openings 35, 37 are stretched so that the discs may enter through these enlarged or deformed openings to be received in the recesses 25, 27. Upon release of the end portions from the stretched condition these end portions 31, 33 contract so as to elastically engage the peripheries of the discs 21, 23 and thereby to exclude any deleterious or foreign material from entering the space within the protector and reaching the surface of the rod 13 which is slidable into and out of the sheath 1.

By virtue of the corrugations 41 of the sleeve 29 and of the elasticity of the flexible material utilized, the sleeve of bellows form may be extended and contracted accordion fashion concomitantly with movement of the rod 13 out of and into the sheath 1. The corrugated form of the bellows, however, provides a certain lengthwise stiffness of the protector which prevents undue sagging between the ends thereof. This resistance to sagging is aided by the rigid discs which are mounted on the sheath and on the rod and maintain at their circumference the end portions of the sleeve in proper coaxial position. The diameter of the discs and the diameter of the bellows-shaped sleeve are such also as to increase this resistance to sagging even for a substantial distance between the two relatively movable members of the mechanical device.

Within the scope of the invention, however, the sleeve may be made of other forms than the bellows form while being made of flexible elastic material such that the end portions thereof may be stretched in the manner described, so that rigid discs 21, 23 may become disposed within the respective recesses 25, 27 in order to support the sleeve on the members and extending about the portion of the rod 13 which projects beyond the sheath 1. In some cases, for example, this sleeve may be of generally cylindrical form while providing the recesses 25, 27 and the extension and contraction thereof may be secured by virtue of the elasticity of the material of which the cylinder is made. The elastic material suitable for the sleeve of any such form may be rubber or a plastic having the proper modulus of elasticity.

In mechanical devices of the type referred to and especially in those of the construction shown in the Patents 2,841,029 and 2,845,313, it has been found to be essential or desirable to avoid torsional movement and strain of the rod 13 relative to the clevis 19. Such torsional movement and strain, which may result from the operation of the flexible tubular control device itself because of its tortuous line of action, may cause binding of the clevis on the mechanical element to which the two legs 43 of the clevis may be connected, for example, by a stud or bolt inserted in the holes 45 shown in the drawing. In order to prevent such twisting of the clevis and the resulting binding, the invention provides for swivel movement of the clevis 19 on the hexagon swivel stud 15. This swivel movement may take place on the axis of the rod 13 and as a result the plane between the legs 43 of the clevis which is perpendicular to the axis of the holes 45 may take any rotational position about the axis of the rod 13 relative to this rod.

To this end the hexagon swivel stud 15 in the embodiment shown is turned to a reduced diameter to provide a cylindrical portion 46, and is still further turned to form a shoulder 47 which bears against the bottom of the recess 49 in the bottom or U of the clevis at the outside thereof. The swivel stud in this further turned portion provides a shank 51 which rotatively bears in the bore 53 in the clevis coaxial with the rod 13. The end portion 55 of the stud 15 is again reduced in diameter to receive a washer 57 which is held against the shoulder formed by the portion 55 by riveting the end 58 as shown in the drawing. The position of the shoulder of the end portion 55 against the shank 51 is such that the washer 57 when riveted into position bears on the recess 59 of the clevis with sufficient clearance to provide for the rotational movement of the clevis on the shank 51 without binding. It will be understood, therefore, that the operating handle or other member which is connected at the holes 45 of the clevis may be disposed in any desired position about the axis of the rod 13 and, if rotational movement occurs in the operation of the flexible remote control device, as described in the patents, as the rod 13 is moved in translation relative to the sheath 1, no binding of either of the members of the flexible control device or the operating handle or controlled member will occur.

Modification of both the sleeve protector and of the clevis construction of the invention may be made to suit different conditions while embodying the features which have been described and to which the appended claims are directed.

I claim:

1. In a mechanical control device of the push-pull type comprising a tubular sheath member having a threaded end and a control rod member slidably received in the threaded end of said sheath member and being provided with a threaded end beyond said sheath member, said sheath member being supported at its threaded end against endwise movement thereof and said rod member being connected at its threaded end to an operating means for slidably moving the same within said sheath member, the combination with said members of a protective sleeve extending about said members from the threaded end of said sheath member to said threaded end of said rod member and having a body portion of corrugated form to provide for extension and contraction of said sleeve lengthwise of said rod member upon slidable movement of the latter within said sheath member, said sleeve having a passageway therethrough substantially greater in transverse dimension than the diameter of said rod and being made of an elastic material of such flexibility that the sleeve per se is not structurally strong enough against collapsing of the corrugated body portion thereof, said sleeve at each end of said body portion thereof being provided with a hollow disc-shaped member defining an annular recess generally coaxial with the longitudinal axis of said rod member; each of said disc-shaped members including an outer circular axial wall of substantial width and having an outside diameter approximating the outside diameter of the body portion of said sleeve, an inside annularly-shaped radial wall of substantial width extending inwardly from said outer axial wall at substantially right angles to the length of said sleeve and connected at its inner circumference to one end of the body portion of said sleeve, and an outer radial wall spaced parallelly from said inside radial wall and having an annular configuration comparable to the latter, the central openings in said inner and outer radial walls having diameters approximating the diameter of said passageway, a pair of rigid discs respectively threadedly engaging and carried by the threaded ends of said sheath and rod members and each of said discs having a periphery extending about said longitudinal axis of a diameter substantially greater than the transverse dimensions of its associated carrying member and of inwardly folded portions of said corrugated sleeve and approximating the outside diameter of said sleeve, said discs respectively being disposed in said disc-shaped sleeve members to support the body portion of said sleeve at each end so as to render said body portion resistant to collapse along said longitudinal axis and to rigidify said inner walls of said sleeve members so that the latter form rigid shoulders between which the corrugations of said body portion are extended and contracted, the flexible material of said sleeve being of sufficient elasticity to enable said disc-shaped members thereof to be stretched to receive said discs and to enable the walls of said members to elastically engage the exterior surfaces of said discs so as to be supported thereby.

2. A protector for a mechanical device having one element movable relative to another element, said protector comprising a rigid disc mounted on one of said elements, a second rigid disc mounted on the other of said elements and axially aligned with said first disc, and a sleeve supported at its ends on said rigid discs and extending therebetween, said sleeve being composed of a body portion of corrugated form and hollow disc-shaped end members connected to the ends of said body portion, and said sleeve being constituted of an elastic material of such flexibility that the corrugated body portion thereof, by itself, is not structurally strong enough against collapsing in the use thereof, said sleeve end members each including an outer circular axial wall of substantial width and having an outside diameter approximating the outside diameter of said sleeve body portion, and inner and outer annularly-shaped radial walls of substantial width extending in spaced parallel relation inwardly from said outer axial wall, the central openings in said inner and outer radial walls being aligned with and of a diameter approximating the diameter of the passageway through said sleeve body portion, and said inner radial wall being connected at its inner circumference to the associated end of said sleeve body portion, the circular axial, and the inner and outer radial walls of each sleeve end member defining an annular recess generally coaxial with the longitudinal axis of said body portion and containing one of said rigid discs, each of said discs being dimensioned to have a volume at least equal to the volume of its associated recess and the flexible material of said sleeve being of sufficient elasticity to enable said sleeve end members to be stretched to receive said discs and to enable the walls of said end members to elastically engage the exterior surfaces of said discs so as to be supported thereby, whereby said sleeve end members and said rigid discs coact to provide rigid end walls between which the corrugations of said body portion are extended and contracted, and said body portion is rendered resistant to collapse along its length.

References Cited in the file of this patent

UNITED STATES PATENTS

| | | |
|---|---|---|
| 123,218 | Beers | Jan. 30, 1872 |
| 838,940 | Bentley | Dec. 18, 1906 |
| 1,493,253 | Eggleston | May 6, 1924 |
| 1,546,397 | Michelson | July 21, 1925 |
| 1,881,266 | DeGiers | Oct. 4, 1932 |
| 2,134,072 | Christensen | Oct. 25, 1938 |
| 2,232,113 | Katcher | Feb. 18, 1941 |
| 2,265,546 | Price | Dec. 9, 1941 |
| 2,276,028 | Dick | Mar. 10, 1942 |
| 2,349,346 | Goepfrich | May 23, 1944 |
| 2,845,812 | Pobar | Aug. 5, 1958 |